W. M. McEWEN.
TRACTOR TRANSMISSION MECHANISM FOR MOTOR VEHICLES.
APPLICATION FILED FEB. 2, 1917.

1,290,266.

Patented Jan. 7, 1919.
2 SHEETS—SHEET 1.

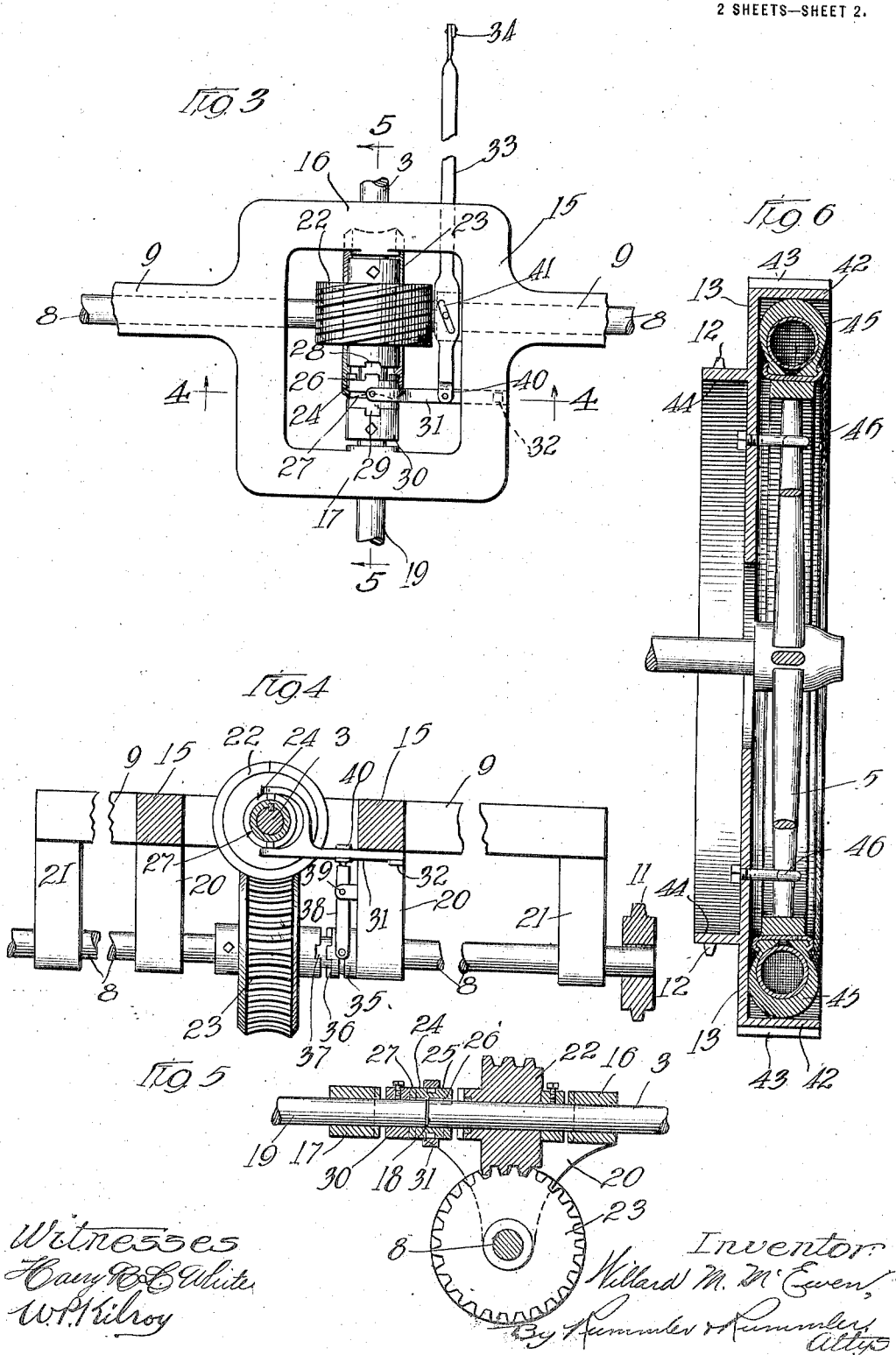

UNITED STATES PATENT OFFICE.

WILLARD M. McEWEN, OF CHICAGO, ILLINOIS.

TRACTOR TRANSMISSION MECHANISM FOR MOTOR-VEHICLES.

1,290,266.  Specification of Letters Patent.  Patented Jan. 7, 1919.

Application filed February 2, 1917.   Serial No. 146,188.

*To all whom it may concern:*

Be it known that I, WILLARD M. McEWEN, a citizen of the United States of America, and a resident of Chicago, county of Cook, and State of Illinois, have invented certain new and useful Improvements in Tractor Transmission Mechanisms for Motor-Vehicles, of which the following is a specification.

The main objects of this invention are to provide an improved form of auxiliary transmission mechanism for motor-driven vehicles whereby a vehicle may be normally constructed for lighter work, such as a pleasure car, and may be readily converted into a tractor; to provide improved means for connecting said auxiliary transmission mechanism in driving relation with the motor of the vehicle; to provide improved means for controlling said auxiliary mechanism; and to provide an auxiliary transmission mechanism of this kind which is simple and compact in construction and which, although it may be conveniently built into a vehicle at the time of its manufacture, is particularly constructed so as to be readily and with little trouble attached to and detached from an automobile normally designed for use as a pleasure car.

An illustrative embodiment of this invention is shown in the accompanying drawings, in which—

Fig. 3 is an enlarged fragmentary plan of the gearing by means of which the tractor transmission is connected to the motor of the vehicle.

Fig. 4 is an elevation of the same as viewed from the plane of the line 4—4 of Fig. 3.

Fig. 5 is a longitudinal sectional elevation taken on the line 5—5 of Fig. 3.

Fig. 6 is an enlarged sectional elevation of one of the driving wheels showing the tractor tread members as attached thereto.

Figure 2:
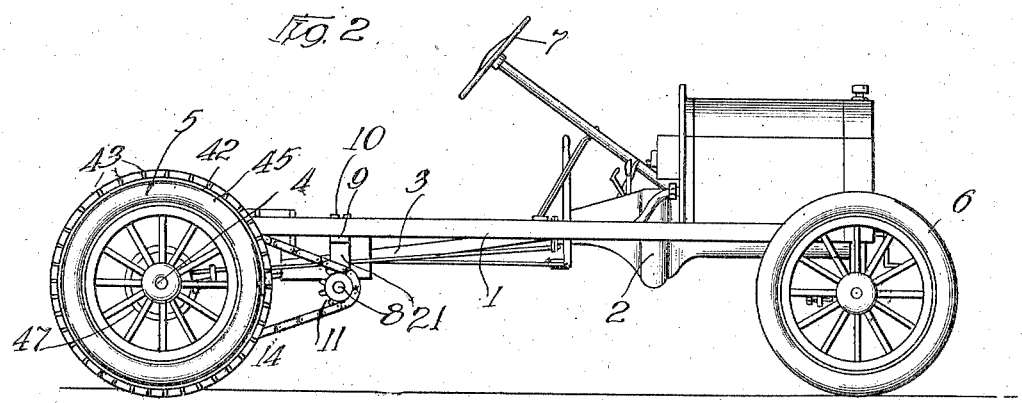
Fig. 2 is a side elevation of the same.

In the construction shown in the drawings, the tractor transmission is shown applied to an automobile chassis normally designed for the support of an ordinary pleasure car body. The illustration shows the chassis frame 1, having the usual motor 2 mounted thereon and connected by a driving shaft 3 to the axle or wheel shaft 4 (Fig. 2) which is journaled at the rear of the chassis frame 1 and connected to rotate the driving wheels 5. The illustration also shows the forward wheels 6 connected so as to be operated by the usual steering wheel 7.

The tractor transmission as herein shown comprises a jackshaft 8 journaled on the frame member 9 which is adapted to be secured to the chassis frame 1 by means of nuts and bolts 10. The jackshaft is so located that sprocket wheels 11, on the ends of said jackshaft, are alined with sprocket wheels 12, formed on the tractor tread members 13, so as to be connected by sprocket chains 14.

The frame member 9 has formed intermediate the ends thereof a bracket 15 which provides bearings 16 and 17 for the driving shaft 3 which, when this tractor transmission is applied to the vehicle, is to be severed as at 18 so that the rear section 19 thereof becomes an independent part of the main driving shaft. This rear section 19 is adapted to be connected and disconnected with the forward section of the main driving shaft 3 by clutch mechanism, as will more fully hereinafter appear.

Figure 1:
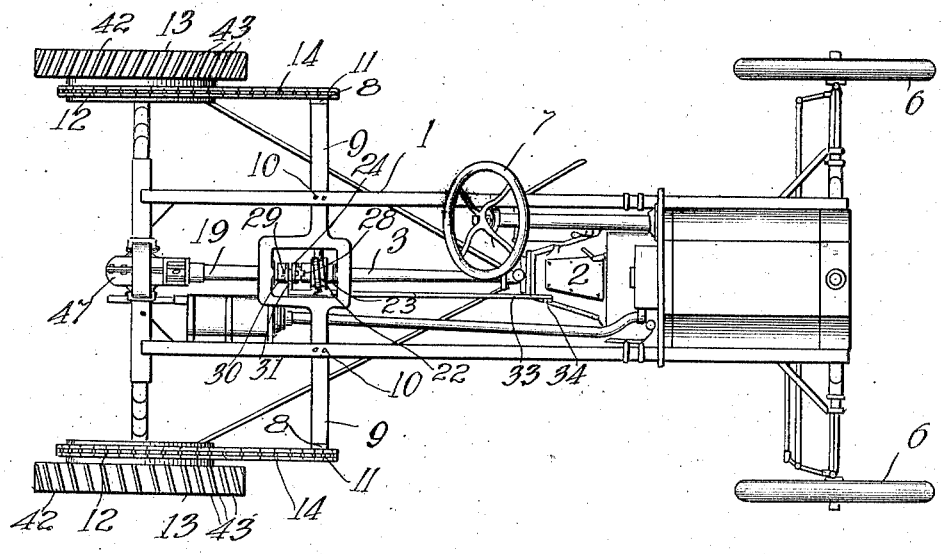
Figure 1 is a plan of a chassis showing the improved form of tractor transmission as applied thereto.

Other bearings 20, adjacent to the bracket 15, and bearings 21, at the ends of the frame member 9, support the jackshaft 8 below the plane of the driving shaft 3 (Fig. 1).

The gearing connecting the jackshaft 8 with the main driving shaft 3 is herein shown in the form of a worm 22 loosely mounted on the main driving shaft 3 and meshing with a gear 23 loosely mounted on the jackshaft 8 between the bearings 20. In order to establish a driving connection for the main driving shaft 3 with either the rear section 19 thereof or with the jackshaft 8, clutch mechanism is provided for connecting the main driving shaft 3 either to the worm 22 or direct to the section 19.

This clutch mechanism comprises a shiftable clutch member 24 slidably mounted on the rear end of the forward section of the driving shaft 3 and splined thereto as at 25. Coacting clutch faces 26 and 27 are formed on the clutch member 24, which are adapted to respectively engage coacting clutch faces 28 and 29 formed on the gear 22 and a collar 30 secured to the forward end of the rear section 19 of the main driving shaft. The usual forked clutch shifting member 31 is pivoted at 32 and connected by a rod or other member 33 to a lever 34 by means of which the shifting of the clutch member 24 is accomplished.

In order to permit the jackshaft 8 and connected parts to run idle, when the motor is driving direct through the rear section 19 of the driving shaft and axle 4, it is necessary to provide auxiliary clutch mechanism for connecting and disconnecting the gear 23 with the jackshaft 8. This includes a clutch member 35, similar to the clutch member 24, slidably mounted on and splined to the jackshaft 8 and having a clutch face 36 adapted to be shifted into and out of engagement with a coacting clutch face 37 formed on the gear 23. A forked clutch shifting member 38 is pivoted at 39 and is provided with a roller 40 at the upper end thereof which is received in a slot 41 formed in the clutch shifting rod 33. The slot 41 is disposed at an angle as shown in Figs. 1 and 3 whereby the shifting of the clutch member 35 into and out of engagement with the gear 23 is simultaneous and automatic with the shifting of the clutch member 24 into and out of engagement with the worm 22.

The tractor tread members 13 are each in the form of an annular plate having an outwardly disposed annular flange 42, on which suitable tread cleats 43 are arranged, and an inwardly disposed annular flange 44, on which the sprocket 12 is formed. These tread members are of such a size as to snugly fit over the tire 45 of the wheel 5 and are secured thereto by means of U-bolts and nuts 46.

This tractor transmission may be incorporated into the vehicle as originally manufactured, in which case the design of some of the parts might be modified somewhat, or it may be in the nature of an auxiliary construction arranged to be attached to an automobile of any of the usual constructions. The latter is an important object of the invention. In such case, the owner of a pleasure car, and more particularly one who lives on a farm where there would be more occasion for using the vehicle for tractor work, would be provided with the tractor tread members 13, the frame member 9 and jackshaft 8, and the connections and gearing as shown. These he could readily and conveniently attach to his car in the manner shown so that at a comparatively small expense and with little trouble, the car can be converted into a tractor.

In either case, the operation of the device is substantially the same, which is as follows:

When it is desired to use the vehicle as a tractor for pulling heavy loads at slow speed, the lever 34 is shifted so as to move the clutch members 24 and 35 to lock the worm 22 and gear 23 to the main driving shaft 3 and jackshaft 8, respectively. The power of the motor 2 will then be applied directly to the wheels 5, which by virtue of the reduction in speed between the worm 22 and gear 23 and the sprockets 8 and 12 will cause a very slow but powerful drive on said wheels.

When it is desired to operate the vehicle at one of its normal speeds, for light work where it is desired to travel rapidly, as for instance, in traveling to and from the work, the lever 34 is shifted so as to disengage the clutch members 24 and 35 from the worm 22 and gear 23 respectively, and at the same time move the clutch member 24 into engagement with the collar 30 on the rear section 19 of the main driving shaft, whereupon the power of the motor is communicated direct to the rear axle 4 (Fig. 2) through the usual differential 47.

When it is desired to use the vehicle as a pleasure car only, the tractor tread members 13 may be readily detached from the wheels 5 and the sprocket chains 14 removed. Then, upon setting the clutch mechanism as explained in the next previous paragraph, the vehicle may be driven at the usual speeds for which it is normally constructed.

Although but one specific embodiment of this invention has been herein shown and described, it will be understood that numerous details of the construction shown may be altered or omitted without departing from the spirit of this invention as defined by the following claims.

I claim:—

1. A transmission mechanism for motor vehicles, comprising a frame, driving wheels, a wheel shaft journaled on said frame for driving said wheels, a main driving shaft, mechanism providing a driving connection for said main driving shaft with said wheel shaft and with each of said wheels direct, and means included in said mechanism and shiftable for controlling the driving connection between said main driving shaft and either said wheel shaft or said wheels direct, as may be desired.

2. A transmission mechanism for motor vehicles, comprising a frame, driving wheels, a wheel shaft journaled on said frame for driving said wheels, a main driving shaft, an auxiliary shaft on said frame connected to rotate said wheels, mechanism providing a driving connection for said main driving shaft with said wheel shaft and with said auxiliary shaft, and means included in said mechanism and shiftable for controlling the driving connection between said main driving shaft and either said wheel shaft or said auxiliary shaft, as may be desired.

3. A transmission mechanism for motor vehicles, comprising a frame, driving wheels, a wheel shaft journaled on said frame for driving said wheels, a main driving shaft, an auxiliary shaft on said frame connected to rotate said wheels, speed reducing gearing included in the connection between said auxiliary shaft and each of said wheels, mechanism providing a driving connection for said main driving shaft with said wheel shaft and with said auxiliary shaft, and means included in said mechanism and shiftable for controlling the driving connection between said main driving shaft and either said wheel shaft or said auxiliary shaft, as may be desired.

4. A transmission mechanism for motor vehicles, comprising a frame, driving wheels, a wheel shaft journaled on said frame for driving said wheels, a main driving shaft, a jackshaft journaled on said frame adjacent to said driving wheels and substantially parallel with said wheel shaft, sprockets on the ends of said jackshaft and on each of said wheels, sprocket chains connecting the sprockets on said jackshaft with the sprockets on said wheels respectively, mechanism providing a driving connection of said main driving shaft with said wheel shaft and with said jackshaft, and means included in said mechanism and shiftable for controlling the driving connection between said main driving shaft and either said wheel shaft or said jackshaft.

5. A transmission mechanism for motor vehicles, comprising a frame, driving wheels, a wheel shaft journaled on said frame for driving said wheels, a main driving shaft, a jackshaft journaled on said frame adjacent to said driving wheels and substantially parallel with said wheel shaft, sprockets on the ends of said jackshaft and on each of said wheels, sprocket chains connecting the sprockets on said jackshaft with the sprockets on said wheels respectively, mechanism providing a driving connection of said main driving shaft with said wheel shaft and with said jackshaft, speed reducing gearing included in the driving connection between said main driving shaft and said jackshaft, and means included in said mechanism and shiftable for controlling the driving connection between said main driving shaft and either said wheel shaft or said jackshaft.

6. A transmission for motor vehicles, comprising a frame, driving wheels, a wheel shaft journaled on said frame for driving said wheels, a longitudinally disposed main driving shaft consisting of two separated alined sections, the rear section of which is connected in driving relation with said wheel shaft, a transversely disposed jackshaft mounted on said frame and connected in driving relation with each of said wheels, gearing connecting the forward section of said main driving shaft with said jackshaft, and clutch mechanism rotatably connected to and shiftable on said forward section of the main driving shaft for establishing a driving connection between said forward section and the rear section of said main driving shaft, or between the forward section of said main driving shaft and said gearing.

7. A transmission for motor vehicles, comprising a frame, driving wheels, a wheel shaft journaled on said frame for driving said wheels, a longitudinally disposed main driving shaft consisting of two separated alined sections, the rear section of which is connected in driving relation with said wheel shaft, a transversely disposed jackshaft mounted on said frame and connected in driving relation with each of said wheels, a worm loosely mounted on the forward section of said main driving shaft and a gear loosely mounted on said jackshaft meshing with said worm, clutch mechanism rotatably connected with and shiftable on the forward section of said main driving shaft for establishing a driving relation between the sections of said main driving shaft or between said forward section and said worm, and other clutch mechanism rotatably connected with and shiftable on said jackshaft for rotatably connecting and disconnecting said gear with said jackshaft.

8. A transmission for motor vehicles, comprising a frame, driving wheels, a wheel shaft journaled on said frame for driving said wheels, a longitudinally disposed main driving shaft consisting of two separated alined sections, the rear section of which is connected in driving relation with said wheel shaft, a transversely disposed jackshaft mounted on said frame and connected in driving relation with each of said wheels, a worm loosely mounted on the forward section of said main driving shaft and a gear loosely mounted on said jackshaft meshing with said worm, clutch mechanism rotatably connected with and shiftable on the forward section of said main driving shaft for establishing a driving relation between the sections of said main driving shaft or between said forward section and said worm, other clutch mechanism rotatably connected with and shiftable on said jackshaft for rotatably connecting and disconnecting said gear with said jackshaft, and clutch shifting means adapted to actuate said clutch mechanisms simultaneously for connecting and disconnecting said worm and gear with said main driving shaft and said jackshaft respectively.

9. In a tractor transmission for a motor-driven vehicle having a pair of driving wheels and a main driving shaft, the combination of tractor tread members attachable to the driving wheels of the vehicle, a frame member, a jackshaft rotatably mounted thereon, means for connecting said frame member to the chassis frame of the vehicle, gearing adapted to connect said jackshaft with said tractor tread members, other gearing for connecting said jackshaft with the main driving shaft of the vehicle, and clutch mechanism shiftable for establishing and disestablishing driving connection between said other gearing and the main driving shaft of the vehicle.

10. In a tractor transmission for a motor-driven vehicle having a pair of driving wheels and a main driving shaft, the combination of tractor tread members attachable to the driving wheels of the vehicle, a frame member, a jackshaft rotatably mounted thereon, means for connecting said frame member to the chassis frame of the vehicle forwardly of the rear axle, sprockets on said tractor tread members and on said jackshaft, sprocket chains connecting the sprockets on said jackshaft with the respective sprockets on said tractor tread members, gearing for connecting said jackshaft with the main driving shaft of the vehicle, and clutch mechanism shiftable for establishing and disestablishing driving connection between said gearing and the main driving shaft of the vehicle.

Signed at Chicago this 31st day of January 1917.

WILLARD M. McEWEN.